(12) United States Patent
Ghalib (10) Patent No.: US 6,503,404 B2
(45) Date of Patent: Jan. 7, 2003

(54) WASTEWATER TREATMENT SYSTEM AND METHOD

(76) Inventor: Saad A. Ghalib, 3466 Richmond Ct., Ann Arbor, MI (US) 48105

( * ) Notice: Subject to any disclaimer, the term of this patent is extended or adjusted under 35 U.S.C. 154(b) by 0 days.

(21) Appl. No.: 09/865,632

(22) Filed: May 25, 2001

(65) Prior Publication Data

US 2001/0047965 A1 Dec. 6, 2001

Related U.S. Application Data

(60) Provisional application No. 60/207,587, filed on May 26, 2000.

(51) Int. Cl.$^7$ .................................................. C02F 1/00
(52) U.S. Cl. ....................... 210/749; 210/754; 210/170; 210/205; 210/252
(58) Field of Search .................................. 210/744, 749, 210/754, 143, 155, 170, 205, 252

(56) References Cited

U.S. PATENT DOCUMENTS

| | | |
|---|---|---|
| 3,592,342 A | 7/1971 | Shankle |
| 4,865,069 A | 9/1989 | Lacey |
| 5,161,911 A | 11/1992 | Regan |
| 5,344,562 A | 9/1994 | Lorenz et al. |
| 5,505,840 A | 4/1996 | Caldwell |
| 5,514,278 A | 5/1996 | Khudenko |
| 5,752,785 A | 5/1998 | Tanaka et al. |
| 6,126,361 A | 10/2000 | Gardiner |
| 6,214,228 B1 * | 4/2001 | Jones et al. |

OTHER PUBLICATIONS

Franklin L. Burton, "Wastewater Engineering Treatmnet, Disposal, and Reuse", Metcalf & Eddy, Inc., revised by George Tchobanoglous, pp. 539 through 552 (McGraw–Hill, Inc., 3d Edition).
"Design of Municipal Wastewater Treatment Plants", WEF Manual of Practice No. 8 4$^{th}$ Edition, ASCE Manuals and Reports on Engineering Practice No. 76, pp. 11–35 through 11–40 (Water Environment Federation, Alexandria, VA and American Society of Civil Engineers, Reston, VA, 1998).

* cited by examiner

*Primary Examiner*—Betsey Morrison Hoey
(74) *Attorney, Agent, or Firm*—Brooks & Kushman, P.C.

(57) ABSTRACT

A method according to the present invention for treating excess wastewater from a sewer system includes receiving excess wastewater from the sewer system in a first portion of a shaft structure; allowing a first quantity of the wastewater to flow from the first portion of the shaft structure into a tunnel in inhibitable fluid communication with the shaft structure; allowing a second quantity of the wastewater to flow from the first portion of the shaft structure into a second portion of the shaft structure when flow into the tunnel is inhibited; injecting a treating agent into the second quantity of wastewater so as to treat the second quantity of wastewater; and allowing a portion of the second quantity of wastewater to flow from the second portion of the shaft structure to an effluent passage in fluid communication with the second portion of the shaft structure after the step of injecting a treating agent.

46 Claims, 8 Drawing Sheets

Fig. 12

WASTEWATER TREATMENT SYSTEM AND METHOD

"This application claims the benefit of U.S. provisional application Ser. No. 60/207,587, filed on May 26, 2000."

BACKGROUND OF THE INVENTION

1. Field of the Invention

The invention relates to systems and methods for treating excess wastewater from a sewer system, such as a combined sewer system or a sanitary sewer system.

2. Background Art

A combined sewer system is a sewer system that is designed to carry both sanitary sewage and storm water runoff. Such sanitary sewage and/or storm water runoff may be referred to as wastewater. During normal conditions, such as dry weather conditions, wastewater is transported by the combined sewer system to a wastewater treatment facility, where the wastewater is treated prior to being discharged. During a rain event, however, flow of wastewater may exceed treatment capacity of the treatment facility. In such a case, overflow wastewater may be diverted to one or more storage basins or tunnels until the treatment facility is able to treat the excess wastewater.

SUMMARY OF THE INVENTION

A method according to the invention for treating excess wastewater from a sewer system includes receiving the excess wastewater from the sewer system in a first portion of a container, wherein the container further includes a second portion in fluid communication with the first portion; allowing the wastewater to flow generally in a first direction through the first portion and then generally in a second direction through the second portion, wherein the second direction is different than the first direction; injecting a treating agent into the wastewater so as to treat the wastewater; and allowing a portion of the wastewater to flow from the second portion to an effluent passage in fluid communication with the second portion after the step of injecting a treating agent.

Further under the invention, a method for treating excess wastewater from a sewer system includes receiving the excess wastewater from the sewer system in a first portion of a shaft structure; allowing a first quantity of the wastewater to flow from the first portion of the shaft structure into a tunnel in inhibitable fluid communication with the shaft structure; allowing a second quantity of the wastewater to flow from the first portion of the shaft structure into a second portion of the shaft structure when flow into the tunnel is inhibited; injecting a treating agent into the second quantity of wastewater so as to treat the second quantity of wastewater; and allowing a portion of the second quantity of wastewater to flow from the second portion of the shaft structure to an effluent passage in fluid communication with the second portion of the shaft structure after the step of injecting a treating agent.

A wastewater treatment system according to the invention for treating excess wastewater from a sewer system includes a shaft structure adapted to receive excess wastewater from the sewer system. The shaft structure has first and second portions, and the first portion is in fluid communication with a tunnel. The system further includes a treating agent dispenser for introducing a treating agent into the excess wastewater, and an effluent passage in fluid communication with the second portion. During a sufficient rain event, excess wastewater flows from the sewer system into the first portion of the shaft structure and then into the tunnel. The treating agent dispenser is operative to introduce the treating agent to thereby treat at least a portion of the excess wastewater, such that if flow of excess wastewater to the shaft structure continues at a sufficient flow rate and flow into the tunnel is inhibited, treated excess wastewater will flow from the first portion into the second portion and then into the effluent passage.

DETAILED DESCRIPTION OF THE PREFERRED EMBODIMENT(S)

Figures 1, 2:
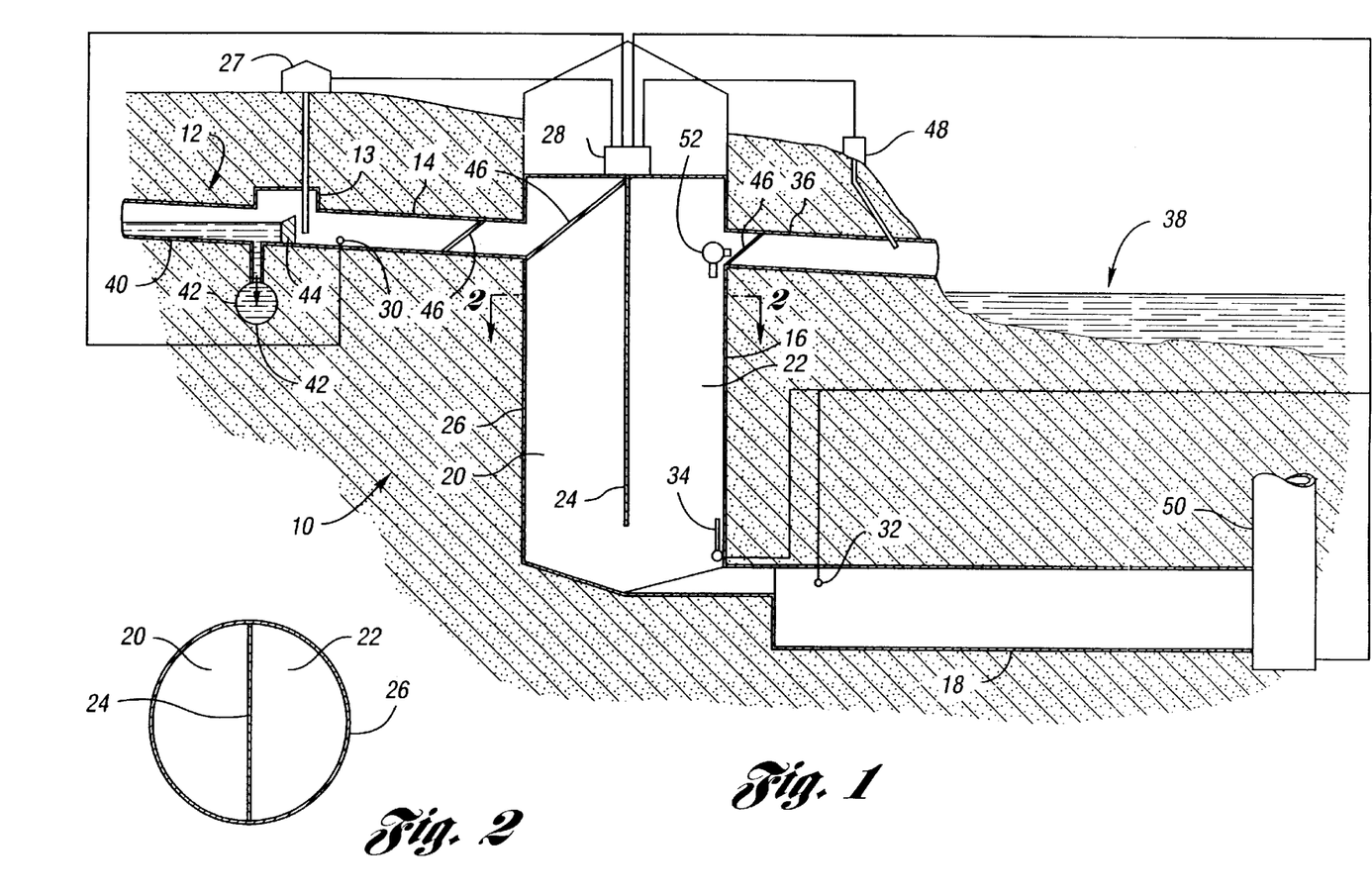
FIG. 1 is a schematic view of a treatment system according to the invention in fluid communication with a sewer system, wherein the treatment system includes a shaft structure having first and second portions, and a tunnel in fluid communication with the shaft structure.
FIG. 2 is a horizontal cross-sectional view of the shaft structure represented in the schematic view of FIG. 1, taken along a line similar to line 2-2 shown in FIG. 1.

FIG. 1 shows a wastewater treatment system 10 according to the invention for treating excess wastewater from a sewer system 12. Sewer system 12 may be, for example, a combined sewer that is designed to carry both sanitary sewage and storm water runoff, or a sanitary sewer system that experiences increased flows during a rain event. Such a sanitary sewer system may experience increased flows due to storm water infiltration into the sanitary sewer system. The term "wastewater" as used in the application refers to sanitary sewage and/or storm water runoff.

The wastewater treatment system 10 includes a diversion chamber 13 and an influent passage 14 for receiving excess wastewater, such as wastewater overflow, from the sewer system 12. The treatment system 10 further includes a first container such as a shaft structure 16 in fluid communication with the influent passage 14, and a second container such as a tunnel 18 in inhibitable fluid communication with the shaft structure 16.

Referring to FIGS. 1 and 2, the shaft structure 16 includes first and second portions, such as first and second passages 20 and 22, respectively, separated by a divider 24, such as a baffle wall. In the embodiment shown in FIG. 2, the divider 24 has a generally straight configuration and is attached to an exterior wall 26 of the shaft structure 16. Alternatively, the divider 24 may have any suitable configuration for dividing the interior of shaft structure 16 into two or more portions having the same or different volumes. For example, the divider 24 may be a baffle wall having a generally V-shaped or a generally U-shaped horizontal cross-section.

In one embodiment of the invention, the shaft structure 16 has a generally circular horizontal cross-section having a diameter in the range of 10 to 200 feet. Alternatively, the shaft structure 16 may have a cross-section that defines any suitable shape, such as a hexagon, octagon, or rectangle. In addition, the shaft structure 16 may have any suitable vertical length, such as a length in the range of 30 to 200 feet. Furthermore, the shaft structure 16 may be made of concrete, or any other suitable material such as steel. For example, the shaft structure 16 may comprise a plurality of concrete rings that are stacked on top of each other in a sealing relationship.

The tunnel 18 may have any suitable size as needed for a particular application. For example, the tunnel 18 may have a diameter in the range of 4 feet to 30 feet, and a length in the range of 0.5 to 10 miles. Furthermore, the tunnel 18 may comprise concrete or any other suitable material, such as steel.

The treatment system 10 also includes a treating agent dispenser, such as a treating agent injection system 27, for injecting or otherwise introducing a treating agent, such as chlorine or a solution that includes chlorine, into the excess wastewater so as to treat the excess wastewater. For example, the treating agent may be a sodium hypochlorite disinfection solution that is used to disinfect the excess wastewater. The treating agent injection system 27 may also include a mixer (not shown) disposed at or near the point of injection for mixing the treating agent with the excess wastewater. The mixer may include, for example, a bubbler and/or a mechanical mixer.

A computer control system, such as a controller 28, is in communication with the treating agent injection system 26 for controlling introduction of the treating agent. The controller 28 is also in communication with a flow sensor 30 disposed in the influent passage 14, a fluid level sensor 32 disposed in the tunnel 18, and an automatic gate 34 for inhibiting flow to the tunnel 18. While the controller 28 may be disposed in any suitable position, in the embodiment shown in FIG. 1, the controller 28 is disposed proximate the shaft structure 16.

An effluent passage 36 is in fluid communication with the second passage 22 of the shaft structure 16. The effluent passage 36 may be used to discharge treated wastewater from the treatment system 10 to a river 38 or any other suitable area, such as another receiving water body.

Figure 3:
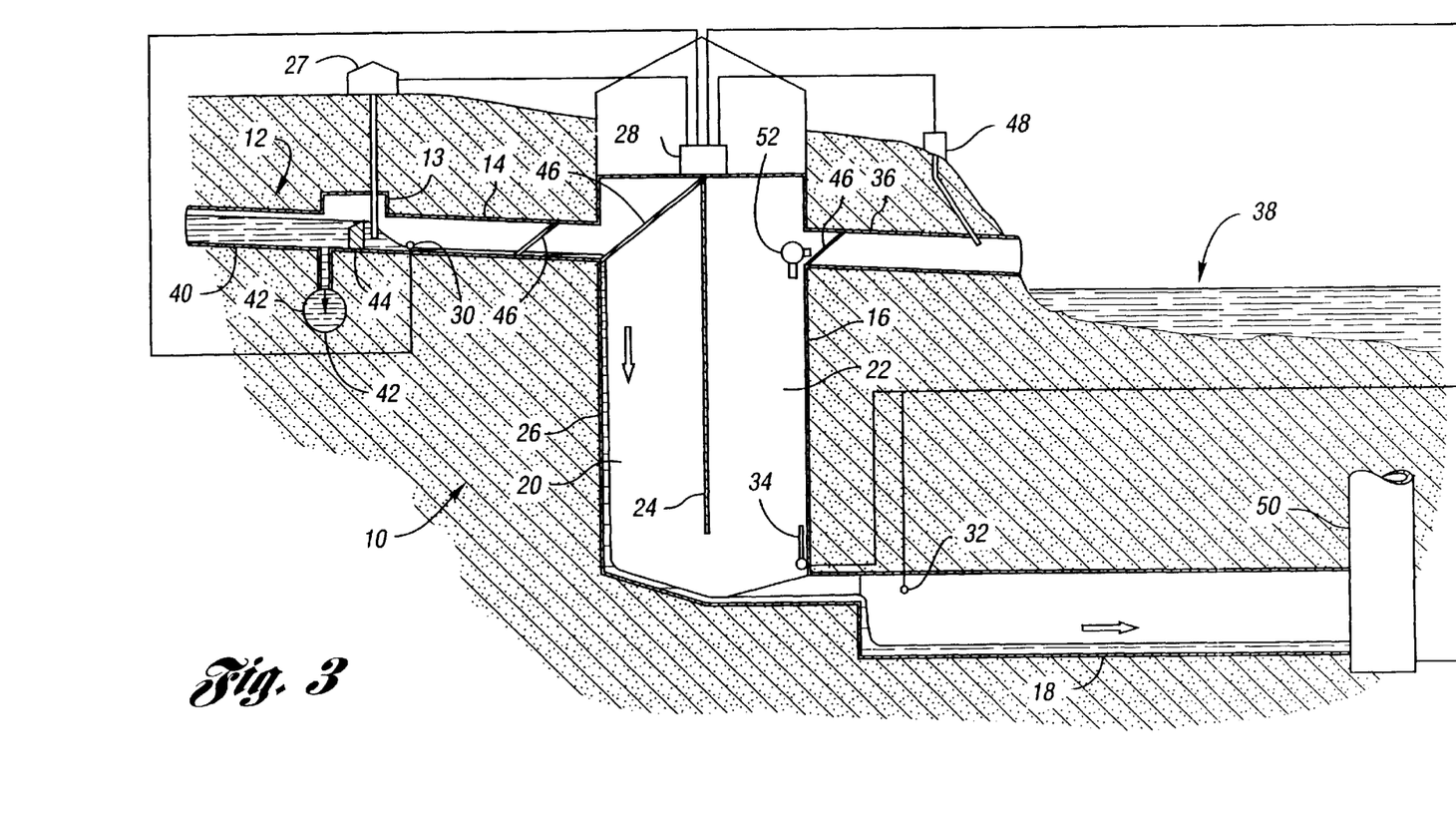
FIG. 3 is a schematic view of the treatment system during a rain event showing excess wastewater flowing from the sewer system through the shaft structure and into the tunnel.

Referring to FIGS. 1–7, operation of the treatment system 10 will now be described in detail. Under normal operating conditions, such as during dry weather conditions, wastewater flows through trunk sewer 40 of the sewer system 12 and into an interceptor 42 as shown in FIG. 1. The interceptor 42 carries wastewater to a treatment facility, such as a wastewater treatment plant (not shown). During a sufficient rain event, flow from the trunk sewer 40 will exceed capacity of the interceptor 42. As shown in FIG. 3, excess wastewater will flow over a weir 44 in diversion chamber 13 and into influent passage 14. Advantageously, the treatment system 10 may be configured to handle a relatively large flow rate, such as a flow rate in the range of 2,000 to 150,000 gallons per minute.

Figure 4:
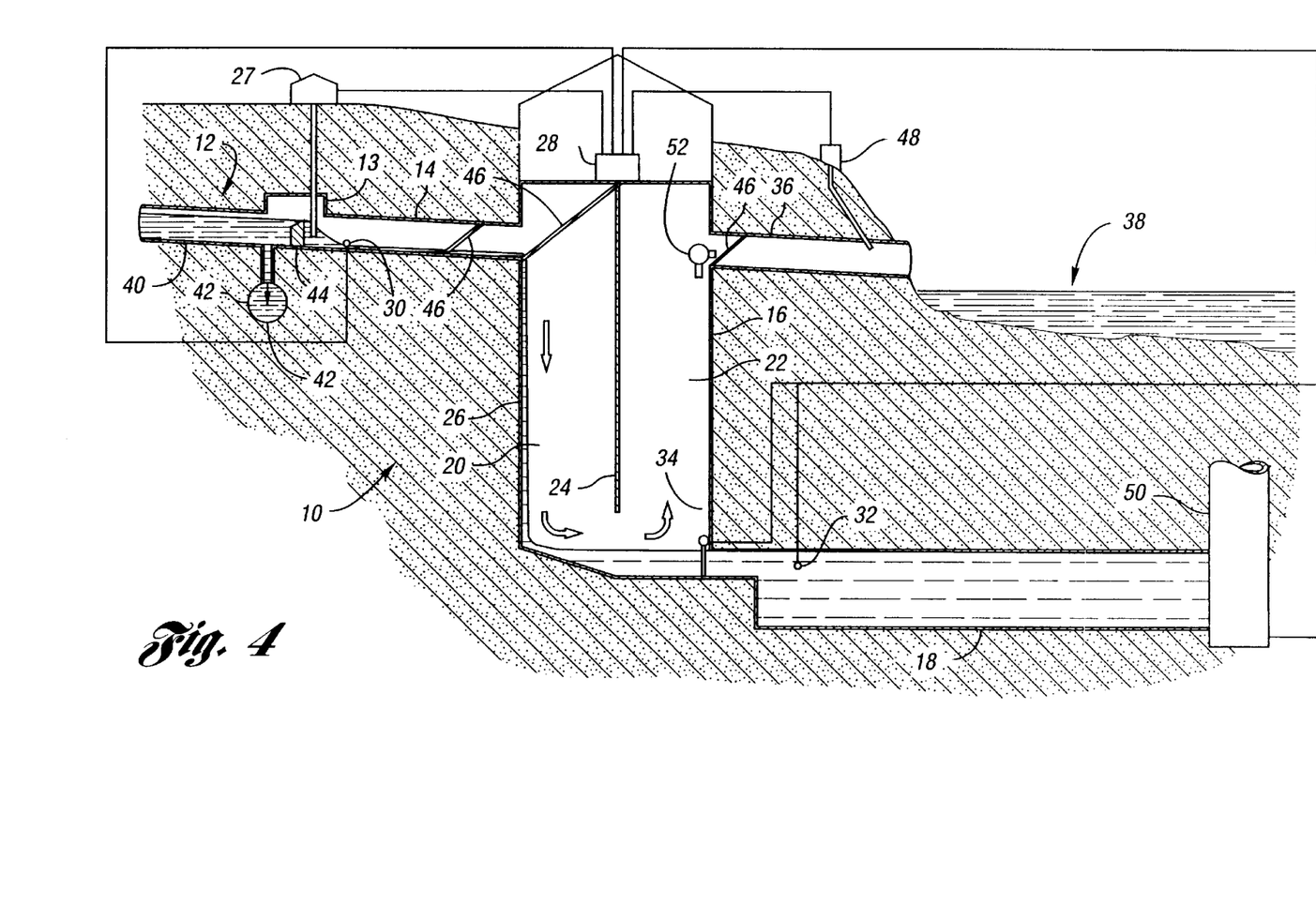
FIG. 4 is a schematic view of the treatment system showing inhibited flow into the tunnel, and excess wastewater flowing from the first portion into the second portion of the shaft structure.

Excess wastewater may then flow through one or more screens 46 located in the influent passage 14 and/or the shaft structure 16 so as to remove floatable matter and/or suspended solids from the excess wastewater. Next, referring to FIG. 3, a first quantity of the excess wastewater will flow through the first passage 20 and into the tunnel 18 until flow into the tunnel 18 is inhibited. Flow into the tunnel 18 may be inhibited when excess wastewater contained in the tunnel 18 reaches a predetermined level and the gate 34 is automatically closed, as shown in FIG. 4. As another example, flow into the tunnel 18 may be inhibited when the tunnel 18 reaches capacity. When flow into the tunnel 18 is inhibited, wastewater may be pumped from the tunnel 18 to allow a certain amount of flow to continue into the tunnel 18. Otherwise, flow into the tunnel 18 may cease.

Referring to FIG. 4, just before flow into the tunnel 18 is inhibited, the controller 28 may cause the treating agent injection system 27 to initiate injection of the treating agent into the excess wastewater. The treating agent may be injected at any suitable rate, such as a rate sufficient to achieve a treating agent level of 10 milligrams per liter of excess wastewater. Mixers of the treating agent injection system 27 may also be used to enhance mixing of the treating agent with the excess wastewater. Such mixers may be located, for example, at and/or downstream of the point of treating agent injection.

Alternatively, treating agent injection may begin at any suitable time, such as immediately upon flow exceeding capacity of the interceptor 42, or any time thereafter. Furthermore, treating agent injection may occur at any suitable point, such as upstream of the shaft structure 16 and/or within the shaft structure 16. For example, treating agent injection may occur upstream of the weir 44 to facilitate mixing of the treating agent with the excess wastewater.

Figure 5:
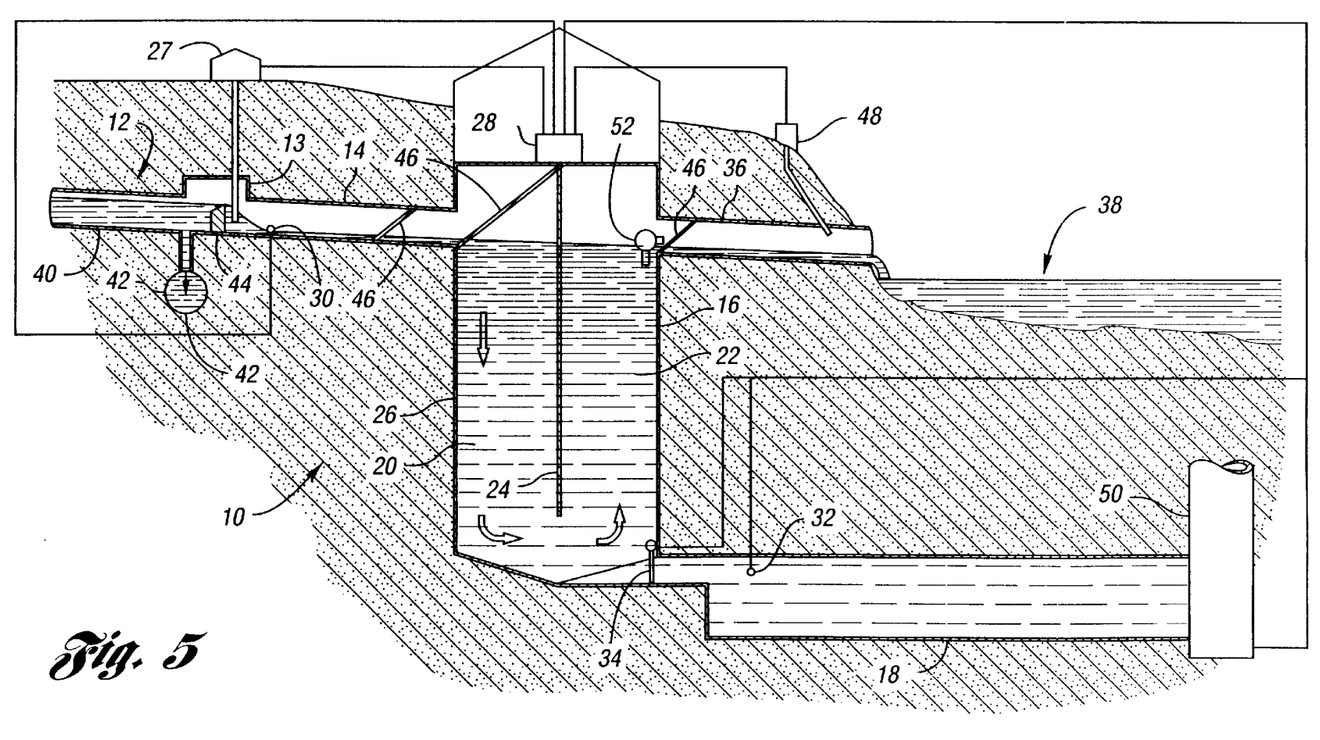
FIG. 5 is a schematic view of the treatment system showing excess wastewater passing from the second portion of the shaft structure to an effluent passage in fluid communication with the shaft structure.

If the rain event continues, excess wastewater will flow through the first passage 20, under the divider 24 and into the second passage 22 until the shaft structure 16 reaches capacity, as shown in FIG. 5. Eventually, if the rain event continues, treated excess wastewater will flow into the effluent passage 36 and then into the river 38. The treatment system 10 may include one or more screens 46 disposed in the effluent passage 36 for removing floatables and/or suspended solids from the treated excess wastewater. Such screens 46 may be provided as an alternative to or in addition to the screens 46 located in the influent passage 14 and/or shaft structure 16.

The treatment system 10 is configured to enable sufficient contact time to occur between the treating agent and the excess wastewater as the excess wastewater continuously flows from the point of treating agent injection to the point of discharge from the effluent passage 36, so as to achieve sufficient disinfection, e.g., bacteria kill, of the excess wastewater at the point of discharge. Sufficient disinfection may be achieved, for example, when the mean fecal coliform bacteria level is less than 400 counts per 100 milliliters of excess wastewater, or other suitable level.

In one embodiment of the invention, the treatment system 10 may be configured to provide a total contact time in the range of 10 to 30 minutes, which may include contact time that occurs in the influent passage 14, the shaft structure 16 and/or the effluent passage 36. Alternatively, the treatment system 10 may be configured to provide any suitable contact time, such as a contact time of less than 10 minutes or greater than 30 minutes, so as to achieve a desired disinfection level. A majority of the contact time, if not all of the contact time, may be provided by the shaft structure 16, which is configured to delay flow of excess wastewater therethrough. The delay is achieved, for example, by allowing the excess wastewater to flow generally in a first direction, such as downwardly, through the first passage 20, and then generally in a second direction, such as upwardly, through the second passage 22. In one embodiment of the invention, the shaft structure 16 may be configured to provide an upward flow rate in the second passage 22 in the range of 0.05 to 1.0 feet per second, for a flow rate into the influent passage 14 in the range of 5,000 to 1,500,000 gallons per minute.

As the excess wastewater flows through the first passage 20, floatable matter that is not trapped by the screens 46 will remain at the top of the first passage 20. Furthermore, as the excess wastewater flows through the shaft structure 16 from the first passage 20 to the second passage 22, relatively heavy solids not removed by the screens 46 will settle at the bottom of the shaft structure 16.

The treatment system 10 may also be configured to provide dechlorination of the excess wastewater before discharging the excess wastewater to the river 38, or other suitable area. For example, the treatment system 10 may include a dechlorinating agent dispenser, such as a dechlorinating agent injection system 48, for introducing a dechlorinating agent, such as sulfate, into the effluent passage 36. The dechlorinating agent injection system 48 may be controlled by the controller 28, or by other suitable means, so that the dechlorinating agent will be introduced at a suitable point. Because dechlorination does not require much, if any, contact time, the dechlorinating agent may be introduced into the effluent passage 36 proximate to the discharge point of the effluent passage 36.

Figure 6:
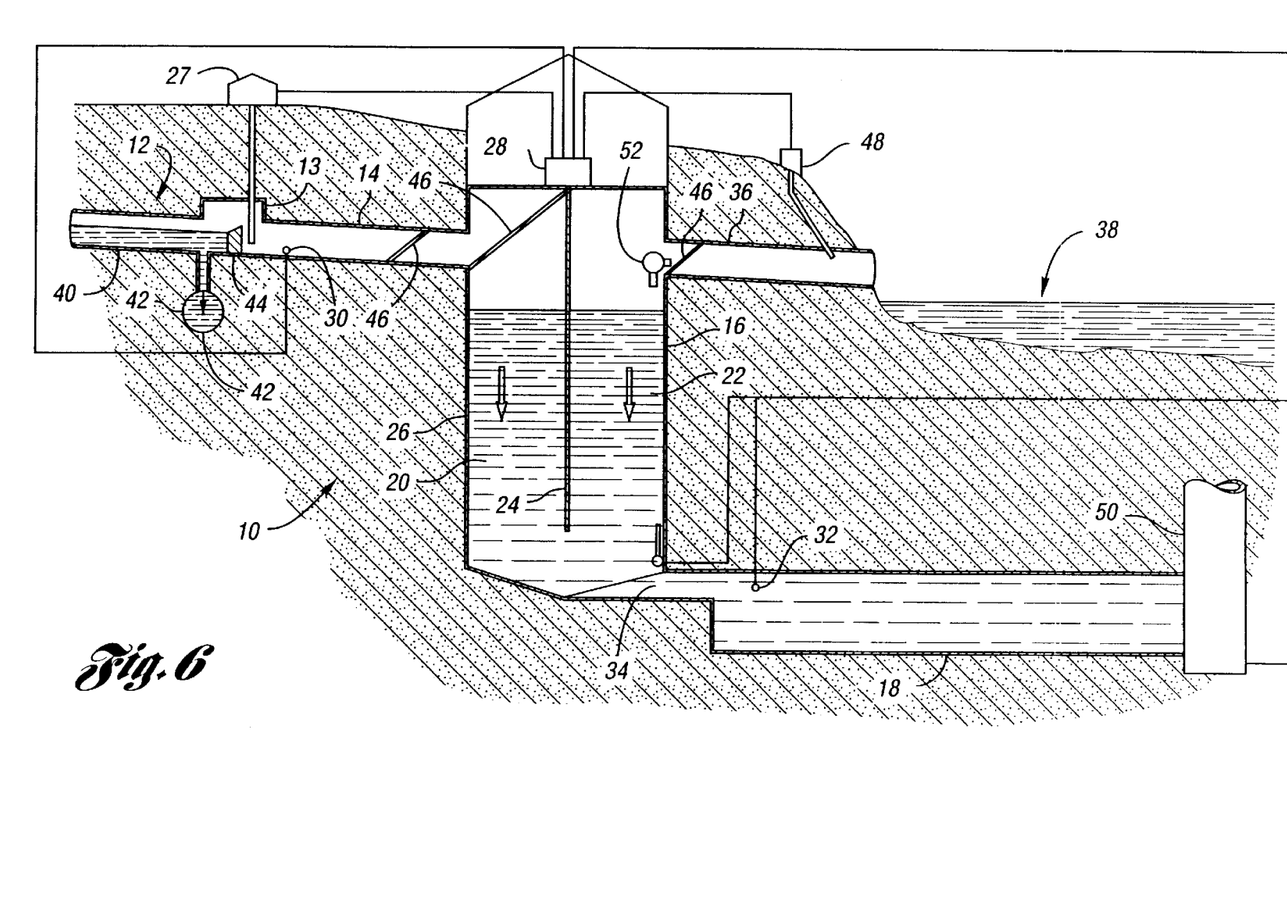
FIG. 6 is a schematic view of the treatment system after the rain event has subsided, and showing the tunnel and the shaft structure being dewatered.

As the rain even subsides, the capacity of the interceptor 42 will no longer be exceeded, and flow to the shaft structure 16 will cease. Referring to FIG. 6, dewatering of the tunnel 18 and shaft structure 16 may begin when the interceptor 42, or other suitable passage, has the capacity to accept dewatering flow rates. The dewatering process begins by disposing all of the matter that was collected by the screens 46 into the shaft structure 16. For example, collected matter may be may be combed, brushed, or otherwise scraped from the screens 46. Alternatively, such matter may be removed from the screens 46 and disposed of elsewhere. A dewatering pumping station 50 in fluid communication with the tunnel 18 may then be used to dewater the shaft structure 16 and tunnel 18. The pumping station 50 may be used to pump excess wastewater from the tunnel 18 to the interceptor 42 and/or to another suitable passage so as to route the excess wastewater to the wastewater treatment plant (not shown).

Figure 7:
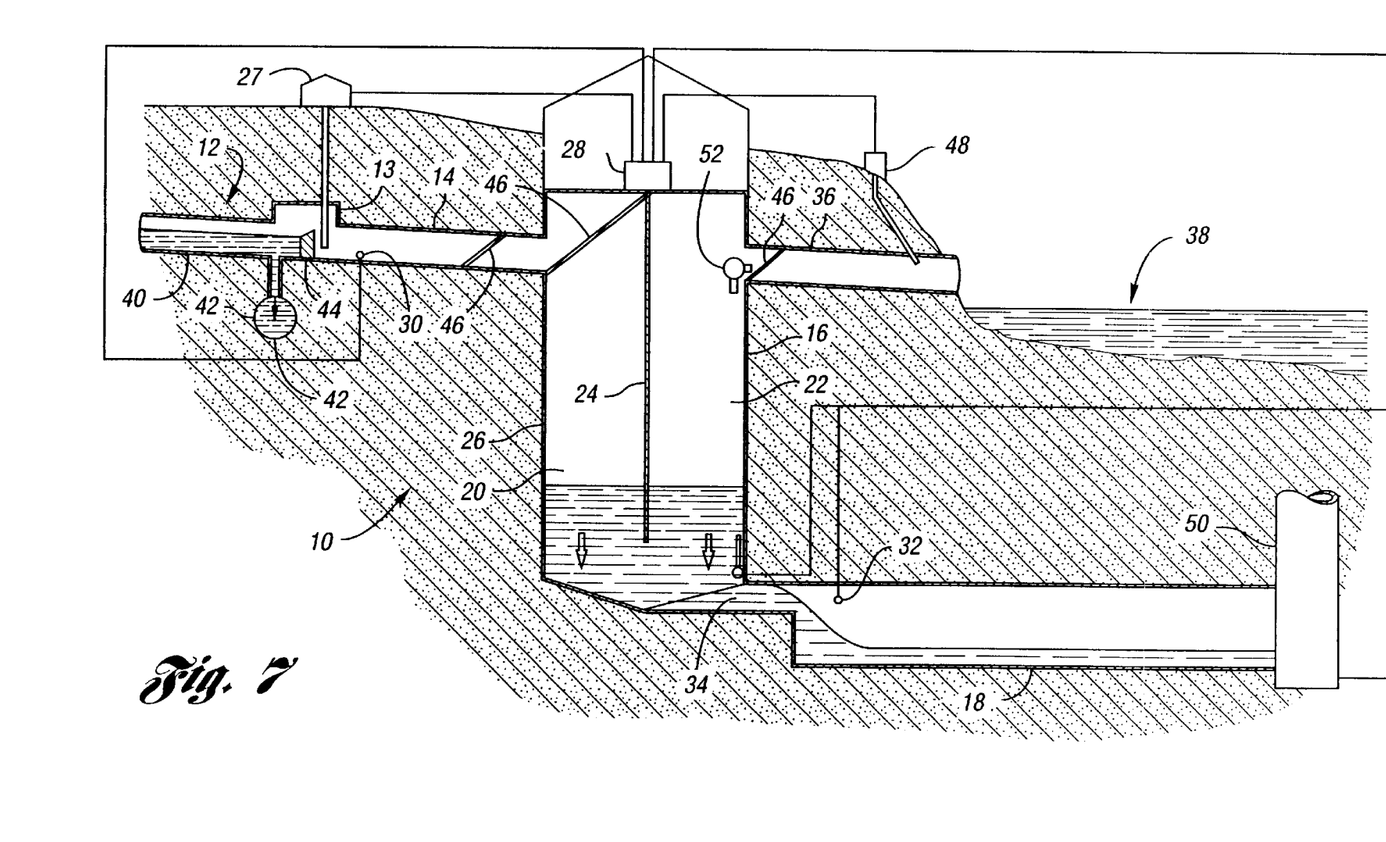
FIG. 7 is a schematic view of the treatment system showing a tunnel flushing operation.

Referring to FIG. 7, if a flushing event is desired, a certain amount of the excess wastewater may be retained in the shaft structure 16 for flushing the tunnel 18. For example, by closing the gate 34 before dewatering the tunnel 18, the tunnel 18 may be dewatered without completely dewatering the shaft structure 16. The gate 34 may then be opened so as to allow the excess wastewater contained in the shaft structure 16 to flush through the tunnel 18.

Because the shaft structure 16 may be configured to provide relatively small vertical flow velocities, head losses caused by the shaft structure 16 may be relatively small. As a result, head drop between the influent passage 14 and the effluent passage 36 may be relatively small. Consequently, depending on flow rates and available head provided by the sewer system 12, it may be possible for excess wastewater to flow through the shaft structure 16 and out the effluent passage 36 without requiring pumping. Furthermore, low flow velocities through the shaft structure 16 also enable solids to settle at the bottom of the shaft structure 16. Alternatively, the treatment system 10 may include a pump 52 for pumping excess wastewater from the second passage 22 into the effluent passage 36.

In addition, because the shaft structure 16 may be large in size, the shaft structure 16 may provide surge protection. More specifically, surge energy developed during filling of the tunnel 18 may be effectively dissipated within the shaft structure 16. Moreover, because the shaft structure 16 may be large in size, the shaft structure 16 may provide air relief as excess wastewater flows through the shaft structure 16 into the tunnel 18.

Because flow of excess wastewater may be diverted from the first passage 20 to the second passage 22 when flow to the tunnel 18 is inhibited, flow through the shaft structure 16 may occur without displacing the first quantity of excess wastewater contained in the tunnel 18. Thus, the first quantity of excess wastewater or "first flush", which may have a high percentage of total suspended solids, may be contained in the tunnel 18 during an overflow event. Furthermore, because the first quantity of excess wastewater does not have to be discharged to the river 38, the first quantity of excess wastewater does not have to be treated with a treating agent. Thus, injection of a treating agent may be limited only to rain events that will result in an overflow to the river 38. Alternatively, the first quantity of excess wastewater may also be treated with a treating agent.

The treatment system 10 also enables the tunnel 18 to be flushed easily, as explained above, using wastewater from the shaft structure 16. Thus, the tunnel 18 may be flushed without requiring additional water to be introduced into the treatment system 10 from another source. Alternatively, the tunnel 18 may be deleted if not required for a particular application.

Figure 8:
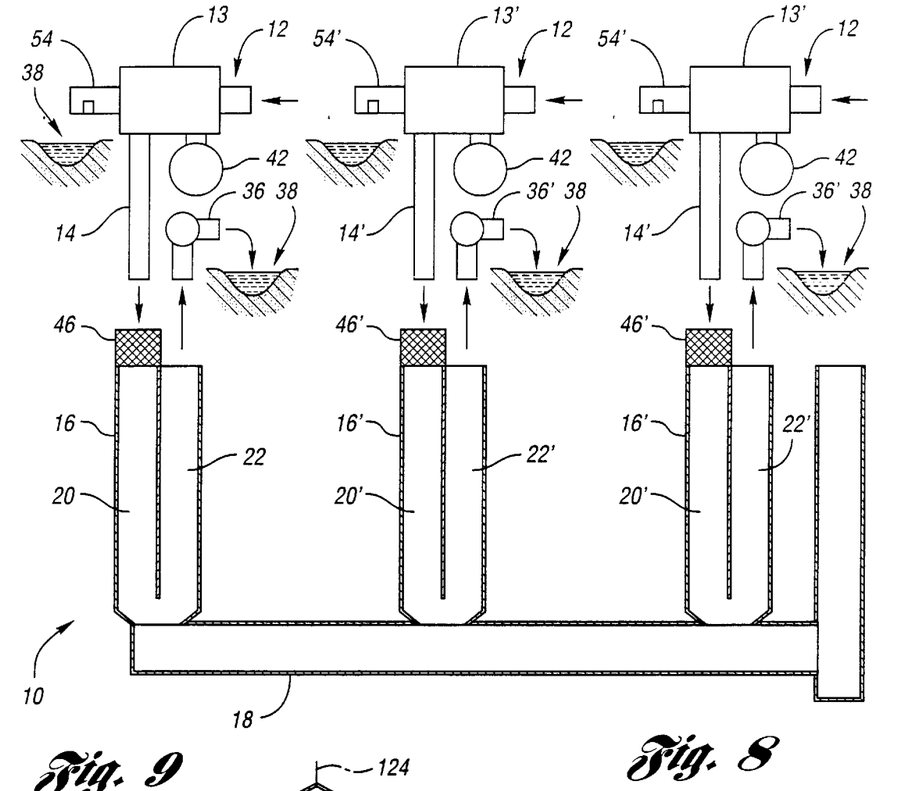
FIG. 8 is a schematic view of the treatment system showing additional shaft structures in fluid communication with the tunnel.

Referring to FIG. 8, the treatment system 10 may include one or more additional first containers, such as additional shaft structures 16', that are in inhibitable fluid communication with the tunnel 18. While FIG. 8 shows only two additional shaft structures 16', the treatment system 10 may include any suitable number of additional shaft structures 16', such as three to twenty additional shaft structures 16'. Each additional shaft structure 16' includes the features of the shaft structure 16, and may receive additional excess wastewater from the sewer system 12, or other sewer system or systems, during a sufficient rain event. For example, each additional shaft structure 16' may receive additional excess wastewater from a particular additional diversion chamber 13' and a particular additional influent passage 14'.

Furthermore, each additional shaft structure 16' is configured to function in a similar manner as described above with respect to the shaft structure 16. For example, each additional shaft structure may allow additional excess wastewater to flow through a respective first portion or passage 20' and into the tunnel 18. Moreover, when flow into the tunnel 18 is inhibited, as described above, each additional shaft structure 16' may allow additional excess wastewater to flow from a respective first passage 20' into a respective second portion or passage 22'. With such a configuration, each additional shaft structure 16' may enable sufficient contact time to occur between a treating agent, such as chlorine or a chlorine based solution, and the additional excess wastewater before the additional excess wastewater is discharged through one or more additional effluent passages 36' into the river 38, or other suitable area.

The treatment system 10 may also include one or more additional treating agent dispensers (not shown) for introducing a treating agent upstream of and/or within a particular additional shaft structure 16', and one or more additional dechlorinating agent dispensers (not shown) for dechlorinating the additional excess wastewater before the additional excess wastewater is discharged into the river 38, or other suitable area. Alternatively, the treating agent injection system 27 described above may be configured to treat wastewater that flows through one or more of the additional shaft structures 16', and the dechlorinating agent injection system 48 described above may be configured to introduce a dechlorinating agent into one or more of the additional effluent passages 36' associated with the additional shaft structures 16'.

Still referring to FIG. 8, the treatment system 10 may also include one or more emergency overflow passages 54 and 54' for allowing excess wastewater to be discharged directly from the diversion chambers 13 and 13' in the event flow rates exceed capacity of the treatment system 10. As shown in FIG. 8, the emergency over flow passages 54 and 54' may be separate from the effluent passages 36 and 36'. Alternatively, each emergency overflow passage 54 or 54' may be connected to a respective effluent passage 36 or 36'.

Figure 9:
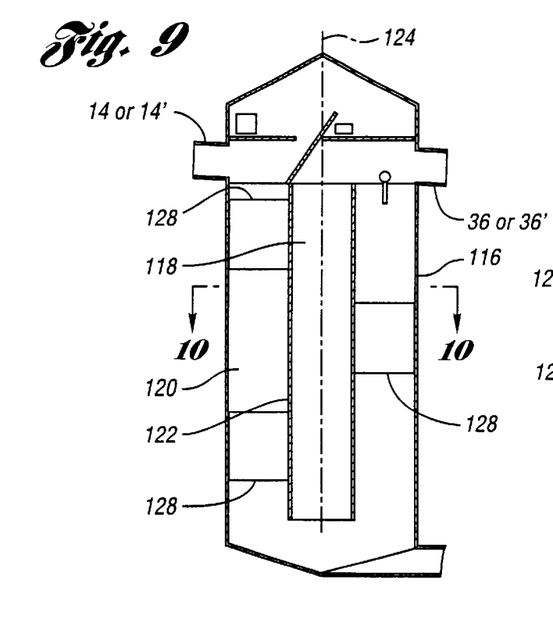
FIG. 9 is a schematic view of a second embodiment of the shaft structure according to the invention.
Figure 10:
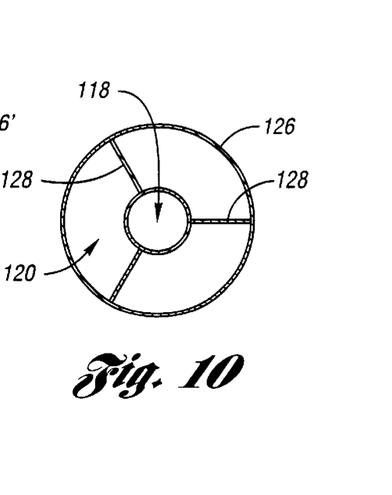
FIG. 10 is a horizontal cross-sectional view of the second embodiment of the shaft structure represented in the schematic view of FIG. 9, taken along a line similar to line 10—10 shown in FIG. 9.

FIGS. 9 and 10 show a second embodiment 116 of the shaft structure according to the invention for use with the tunnel 18. The shaft structure 116 includes first and second portions, such as first and second passages 118 and 120, respectively, separated by a divider 122. The divider 122 may be, for example, a tube that is coaxially aligned with an axis 124 of the shaft structure 116, such that the divider 122 defines the first and second passages 118 and 120 as coaxially aligned inner and outer channels, respectively, having annular cross-sections.

The divider 122 may be connected to an outer wall 126 of the shaft structure 116 in any suitable manner, such as with one or more radially extending tabs 128 that may be made of any suitable material, such as reinforced concrete or steel. Alternatively or supplementally, the divider 122 may extend to the bottom of the shaft structure 116 for support. With such a configuration, one or more laterally extending passages may be provided at or near the bottom end of the divider 122 for allowing excess wastewater to pass from the first passage 118 to the second passage 120. As another example, the divider 122 may be positioned adjacent to and connected directly with the outer wall 126. With such a configuration, the first passage 118 will have an axis that is not coaxially aligned with the axis 124.

The shaft structure 116 is configured so that excess wastewater that passes through the influent passage 14 or 14' will flow into the first passage 118. As shown in FIG. 9, the first pas sage 118 i s in inhibitable fluid communication with the tunnel 18 for allowing excess wastewater to flow from the first passage 118 into the tunnel 18. As with the shaft structure 16, when flow to the tunnel 18 is inhibited, excess wastewater may flow generally downwardly through the first passage 118, then generally upwardly through the second passage 120, and finally into the effluent passage 36 or 36'.

Figure 11:
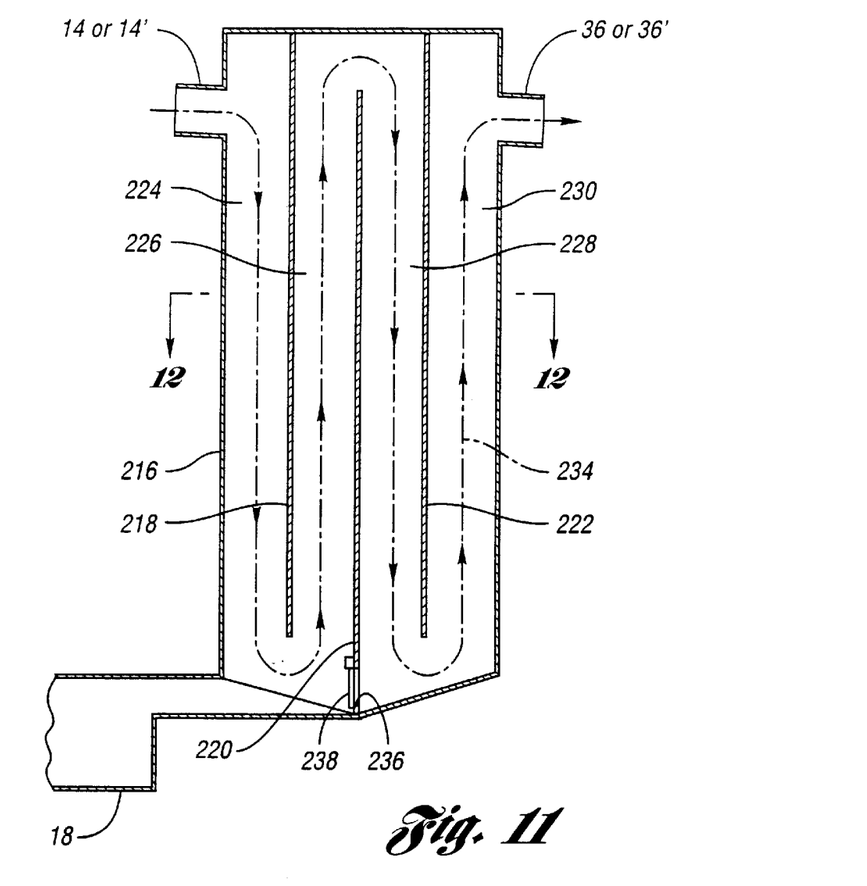
FIG. 11 is a schematic view of a third embodiment of the shaft structure according to the invention.
Figure 12:
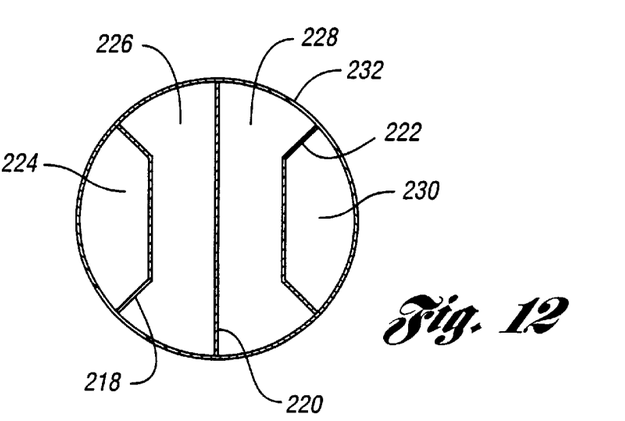
FIG. 12 is a horizontal cross-sectional view of the third embodiment of the shaft structure represented in the schematic view of FIG. 11, taken along a line similar to line 12—12 shown in FIG. 11.

FIGS. 11 and 12 show a third embodiment 216 of the shaft structure according to the invention for use with the tunnel 18. The shaft structure 216 includes a plurality of dividers, such as first, second and third dividers 218, 220 and 222, respectively, that define a plurality of shaft portions, such as first, second, third and fourth passage s 224 , 226, 228 and 230, respectively. As shown in FIG. 12, the dividers 218, 220 and 222 may be connected to an outer wall 232 of the shaft structure 216.

As shown in FIG. 11, the first passage 224 is in inhibitable fluid communication with the tunnel 18 for allowing excess wastewater to flow from the first passage 224 into the tunnel 18. When flow to the tunnel 18 is inhibited, flow of excess wastewater through the shaft structure 216 may follow flow path 234, and then enter effluent passage 36 or 36'. Because of the multiple changes in flow direction, increased mixing of the excess wastewater with a treating agent may be achieved.

The second divider 220 may include a lateral passage 236 extending therethrough, for allowing excess wastewater to flow from the third and fourth passages 228 and 230, respectively, into the tunnel 18 after a particular rain event has subsided. In addition, the second divider 220 may include an automatic gate 238 that can be closed so as to inhibit or prevent flow through the passage 236 when excess wastewater is flowing into the shaft structure 216 from the influent passage 14 or 14'.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for treating excess wastewater from a sewer system, the method comprising:
   receiving the excess wastewater from the sewer system in a first portion of a container, wherein the container further includes a second portion in fluid communication with the first portion;
   allowing the wastewater to flow generally in a first direction through the first portion, and then generally in a second direction through the second portion, wherein the second direction is different than the first direction;
   introducing a treating agent into the wastewater so as to disinfect the wastewater; and
   allowing a portion of the wastewater to flow from the second portion to an effluent passage in fluid communication with the second portion after the step of introducing a treating agent.

2. The method of claim 1 wherein the step of receiving wastewater includes receiving wastewater at a flow rate of at least 2,000 gallons per minute.

3. The method of claim 1 wherein the step of receiving wastewater includes receiving wastewater at a flow rate in the range of 5,000 to 1,500,000 gallons per minute.

4. The method of claim 1 wherein the container is a shaft structure having a diameter of at least 10 feet, and wherein a majority of the shaft structure is disposed underground.

5. The method of claim 1 wherein the container is a shaft structure having a diameter in the range of 25 to 200 feet.

6. The method of claim 1 wherein the first direction extends downwardly, and the second direction extends upwardly.

7. The method of claim 1 wherein the step of introducing a treating agent includes injecting chlorine upstream of the container.

8. The method of claim 7 wherein the step of introducing a treating agent further includes injecting chlorine within the container.

9. The method of claim 1 wherein the step of introducing a treating agent includes injecting chlorine within the container.

10. The method of claim 1 wherein the step of allowing a portion of the wastewater to flow from the second portion to an effluent passage includes pumping the portion of the wastewater.

11. The method of claim 1 wherein the first container further includes third and fourth portions in fluid communication with the first and second portions, and wherein the method further includes allowing the wastewater to flow generally in the first direction through the third portion, and then generally in the second direction through the fourth portion before allowing the portion of the wastewater to flow to the effluent passage.

12. The method of claim 1 wherein the treating agent comprises chlorine.

13. A method for treating excess wastewater from a sewer system, the method comprising:
    receiving the excess wastewater from the sewer system in a first portion of a first container;
    allowing a first quantity of the wastewater to flow from the first portion of the first container into a second container in inhibitable fluid communication with the first container;
    allowing a second quantity of the wastewater to flow from the first portion of the first container into a second portion of the first container when flow into the second container is inhibited;
    injecting a treating agent into the second quantity of wastewater so as to treat the second quantity of wastewater; and
    allowing a portion of the second quantity of wastewater to flow from the second portion of the first container into an effluent passage in fluid communication with the second portion of the first container after the step of injecting a treating agent.

14. The method of claim 13 wherein the step of receiving wastewater includes receiving wastewater at a flow rate in the range of 5,000 to 1,500,000 gallons per minute.

15. The method of claim 13 wherein a majority of the first container is disposed underground, and wherein the first container has a diameter of at least 10 feet.

16. The method of claim 13 wherein the first container has a diameter in the range of 25 to 200 feet.

17. The method of claim 13 wherein the step of injecting a treating agent includes injecting chlorine upstream of the first container.

18. The method of claim 17 wherein the step of injecting a treating agent further includes injecting the treating agent within the first container.

19. The method of claim 17 wherein the step of injecting a treating agent further includes injecting chlorine within the first container.

20. The method of claim 13 further comprising injecting a treating agent into the first quantity of wastewater.

21. The method of claim 13 further comprising removing at least a portion of the first quantity of wastewater contained in the second container after flow from the sewer system to the first container has sufficiently reduced.

22. The method of claim 21 further comprising flushing the second container with another portion of the second quantity of wastewater contained in the first container after the step of removing at least a portion of the first quantity of wastewater contained in the second container.

23. The method of claim 13 further comprising:
    receiving additional wastewater from the sewer system in a first portion of an additional container that is in fluid communication with the second container;
    allowing a first quantity of the additional wastewater to flow from the first portion of the additional container into the second container;
    allowing a second quantity of the additional wastewater to flow from the first portion of the additional container into the second portion of the additional container when flow into the second container is inhibited;
    injecting chlorine into the second quantity of additional wastewater so as to treat the second quantity of additional wastewater; and
    allowing a portion of the second quantity of additional wastewater to flow from the second portion of the additional container into an additional effluent passage in fluid communication with the second portion of the additional container after the step of injecting chlorine into the second quantity of additional wastewater.

24. The method of claim 13 wherein the step of receiving wastewater includes receiving wastewater at a flow rate of at least 2,000 gallons per minute.

25. The method of claim 13 wherein the step of injecting a treating agent includes injecting the treating agent within the first container.

26. The method of claim 13 wherein the step of injecting a treating agent includes injecting the treating agent into the second quantity of wastewater so as to disinfect the second quantity of wastewater.

27. The method of claim 26 wherein the treating agent comprises chlorine.

28. The method of claim 13 wherein the step of injecting a treating agent includes injecting chlorine within the first container.

29. A method for treating excess wastewater from a sewer system, the method comprising:
    receiving the excess wastewater from the sewer system in multiple influent passages, each influent passage being in fluid communication with one of a plurality of shaft structures;
    injecting chlorine into the excess wastewater so as to treat the excess wastewater;
    allowing the excess wastewater to flow from each influent passage into a respective shaft structure, wherein the shaft structures are in inhibitable fluid communication with a tunnel, and each shaft structure includes first and second portions;
    allowing a first quantity of the excess wastewater to flow from the first portion of at least one of the shaft structures to the tunnel;
    allowing a second quantity of the excess wastewater to flow from the first portions into the second portions when flow into the tunnel is inhibited; and
    allowing the second quantity of excess wastewater to flow from the second portions into a plurality of effluent passages after the step of injecting chlorine, wherein each effluent passage is in fluid communication with a particular second portion of one of the shaft structures, and wherein each shaft structure is configured to enable sufficient contact time to occur between the chlorine and the excess wastewater flowing through the shaft structure.

30. A method for treating excess wastewater from a sewer system, the method comprising:

flowing the excess wastewater through a first container and into a second container until flow into the second container is inhibited;

introducing a treating agent into the excess wastewater;

delaying flow through the first container after flow to the second container has been inhibited to allow sufficient contact time to occur between the treating agent and the excess wastewater; and flowing the excess wastewater through an effluent passage in fluid communication with the first container.

31. The method of claim 30 wherein the step of introducing a treating agent includes introducing the treating agent into the excess wastewater to disinfect the excess wastewater.

32. The method of claim 31 wherein the treating agent comprises chlorine.

33. The method of claim 30 wherein the step of introducing a treating agent includes introducing chlorine upstream of the first container.

34. The method of claim 33 wherein the step of introducing a treating agent further includes introducing chlorine within the first container.

35. The method of claim 30 wherein the step of introducing a treating agent includes introducing chlorine within the first container.

36. A wastewater treatment system for treating excess wastewater from a sewer system, the wastewater treatment system comprising:

a shaft structure adapted to receive excess wastewater from the sewer system, the shaft structure having first and second portions;

a tunnel in fluid communication with the first portion;

a treating agent dispenser for introducing a treating agent into the excess wastewater; and an effluent passage in fluid communication with the second portion;

wherein during a sufficient rain event, the excess wastewater flows from the sewer system into the first portion of the shaft structure and then into the tunnel, and wherein the treating agent dispenser is operative to introduce the treating agent to thereby treat at least a portion of the excess wastewater, such that if flow of excess wastewater to the shaft structure continues at a sufficient flow rate and flow into the tunnel is inhibited, treated excess wastewater will flow from the first portion into the second portion and then into the effluent passage.

37. The wastewater treatment system of claim 36 wherein the first and second portions of the shaft structure are disposed adjacent to each other and are separated by a divider.

38. The wastewater treatment system of claim 36 wherein the shaft structure has a diameter of at least 10 feet.

39. The wastewater treatment system of claim 36 wherein the shaft structure has a diameter in the range of 25 to 200 feet.

40. The wastewater treatment system of claim 36 wherein the shaft structure comprises concrete.

41. The wastewater treatment system of claim 36 further comprising a controller associated with the treating agent dispenser for controlling introduction of the treating agent.

42. The wastewater treatment system of claim 36 wherein the treating agent dispenser is configured to introduce the treating agent for disinfecting the excess wastewater.

43. The wastewater treatment system of claim 36 wherein the treating agent dispenser is configured to introduce chlorine into the excess wastewater.

44. The wastewater treatment system of claim 36 wherein the treating agent dispenser is configured to introduce chlorine upstream of the shaft structure.

45. The wastewater treatment system of claim 44 wherein the treating agent dispenser is further configured to introduce chlorine within the shaft structure.

46. The wastewater treatment system of claim 36 wherein the treating agent dispenser is configured to introduce chlorine within the shaft structure.

* * * * *